United States Patent [19]

Klimkovsky et al.

[11] Patent Number: 4,997,292
[45] Date of Patent: Mar. 5, 1991

[54] VERTICAL BEARING ASSEMBLY

[75] Inventors: Bronislav M. Klimkovsky; Alexandr I. Patser; Nikolai M. Potapov; Vladimir M. Pasalsky; Pavel G. Anofriev, all of Dnepropetrovsk, U.S.S.R.

[73] Assignee: Nauchno-Proizvodstvennoe Obiedinenie Po Mekhanizatsii Robotisatsii Truda I Sovershenstvovaniju Remontnogo Obespechenia Na Predpriyatiyakh Chernoi Metallurgii Npo "Chermetmekhanizatsia", Dnepropetrovsk, U.S.S.R.

[21] Appl. No.: 499,273

[22] PCT Filed: Oct. 25, 1988

[86] PCT No.: PCT/SU88/00209

§ 371 Date: Jun. 13, 1990

§ 102(e) Date: Jun. 13, 1990

[87] PCT Pub. No.: WO90/04726

PCT Pub. Date: May 3, 1990

[51] Int. Cl.$^5$ .............................. F16C 19/10
[52] U.S. Cl. ...................... 384/448; 384/99; 384/611; 384/613
[58] Field of Search ............... 384/611, 613, 619, 99, 384/448

[56] References Cited

U.S. PATENT DOCUMENTS

| 4,240,683 | 12/1980 | Crase | 384/613 |
| 4,363,608 | 12/1982 | Mulders | 384/619 |
| 4,892,423 | 1/1990 | Takahashi et al. | 384/613 |

FOREIGN PATENT DOCUMENTS

| 2043893 | 2/1971 | France . |
| 2393186 | 12/1978 | France . |
| 72872 | 8/1959 | U.S.S.R. . |
| 162005 | 4/1964 | U.S.S.R. . |
| 509735 | 9/1976 | U.S.S.R. . |
| 681250 | 8/1979 | U.S.S.R. . |

Primary Examiner—Lenard A. Footland
Attorney, Agent, or Firm—Fleit, Jacobson, Cohn, Price, Holman & Stern

[57] ABSTRACT

A bearing assembly is designed for high-speed heavy-duty vertical shafts and has a casing (1), antifriction bearings (3) with outer (5) and inner (4) races, and a load redistribution system (A). The load redistribution system (A) has elastic members (7) provided between the outer races (3), rigid spacer sleeves (6) provided between the inner races (4), and coupling members (8) engaging one another and, via separating members (9), the elastic members (7).

4 Claims, 3 Drawing Sheets

VERTICAL BEARING ASSEMBLY

TECHNICAL FIELD

The invention relates to the mechanical engineering, an in particular, it deals with a vertical bearing assembly and may be used in heavy-duty high-speed vertical shafts and in vertical centrifugal machines, drilling rigs and generators.

BACKGROUND OF THE INVENTION

In the conventional vertical bearing assemblies, bearings are installed in series on a shaft and are separated by rigid sleeves. This results in a non-uniform load on the bearings thus lowering durability of the assembly.

The most similar to the invention is a vertical bearing assembly, comprising antifriction bearings mounted one above another in a casing in a radially spaced relation thereto, each bearing being formed by bodies of revolution positioned between inner and outer races, and a system for redistribution of load between the bearings (SU, A, 681250; 509732).

The system for redistribution of load is formed by elastic members in the form of Belville or other springs located between inner and outer races of the bearings, the elastic members being unconnected to one another. With this construction, when the assembly is loaded, forces are transmitted in a sequence from one bearing to another. As a result, all bearings are loaded with the initially applied force. Thus the load is not uniformly distributed among the bearings. This lowers durability of the assembly, especially at high speeds.

SUMMARY OF THE INVENTION

The invention is based on the problem of providing a vertical bearing assembly in which the load redistribution system is so constructed as to ensure a uniform distribution of load among the bearings so as to enhance durability and reliability of the assembly.

This problem is solved by that in a vertical bearing assembly comprising antifriction bearings mounted in a casing in a radially spaced relation thereto, each bearing having bodies of revolution positioned between outer and inner races, and a load redistribution system among the antifriction bearings having elastic members placed between the inner or outer races of all bearings, according to the invention, the load redistribution system comprises rigid spacer sleeves provided between outer or inner rings, respectively, of adjacent bearings, separating members provided between the races of the bearings which are in contact with the elastic members, an axial clearance being defined therebetween, and coupling members engaging one another and, via the separating members, the elastic members.

The provision of the separating members and coupling members and forming an axial clearance between identical races of the bearings make it possible to load all the bearings so as to redistribute the load among the bearings, the load applied to one bearing being proportional to the number of the bearings.

The coupling members are preferably made in the form of bushings, each having an inner annular shoulder defining the separating member, the bushing being movable along the casing, the elastic members comprising spacers so as to simplify design of the assembly.

The elastic and separating members may be in the form of hollow chambers communicating with one another and filled with a compressed gas, the separating members being rigidly secured to the casing. This construction makes it possible to ensure a low fundamental frequency of the assembly and enhance its damping capacity thus, in the end of the day, lowering loads in the assembly and enhancing its durability.

In accordance with an embodiment of the vertical bearing assembly, it is provided with a unit for controlling operation of the hollow chambers, comprising a pressure source, high- and low-pressure receivers and a feedback line, the high- and low-pressure receivers being connected to the hollow chambers, pressure source and feedback line.

This construction makes it possible, depending on speed of the bearing assembly, to vary its fundamental frequency instantaneously so as to materially reduce amplitude of oscillations of the bearing assembly under acceleration and braking conditions, i.e. in the resonance modes.

BRIEF DESCRIPTION OF THE DRAWINGS

The invention will now be described with reference to a detailed description of its embodiments illustrated in the accompanying drawings, in which.

BEST MODE FOR CARRYING OUT THE INVENTION

Figure 1:
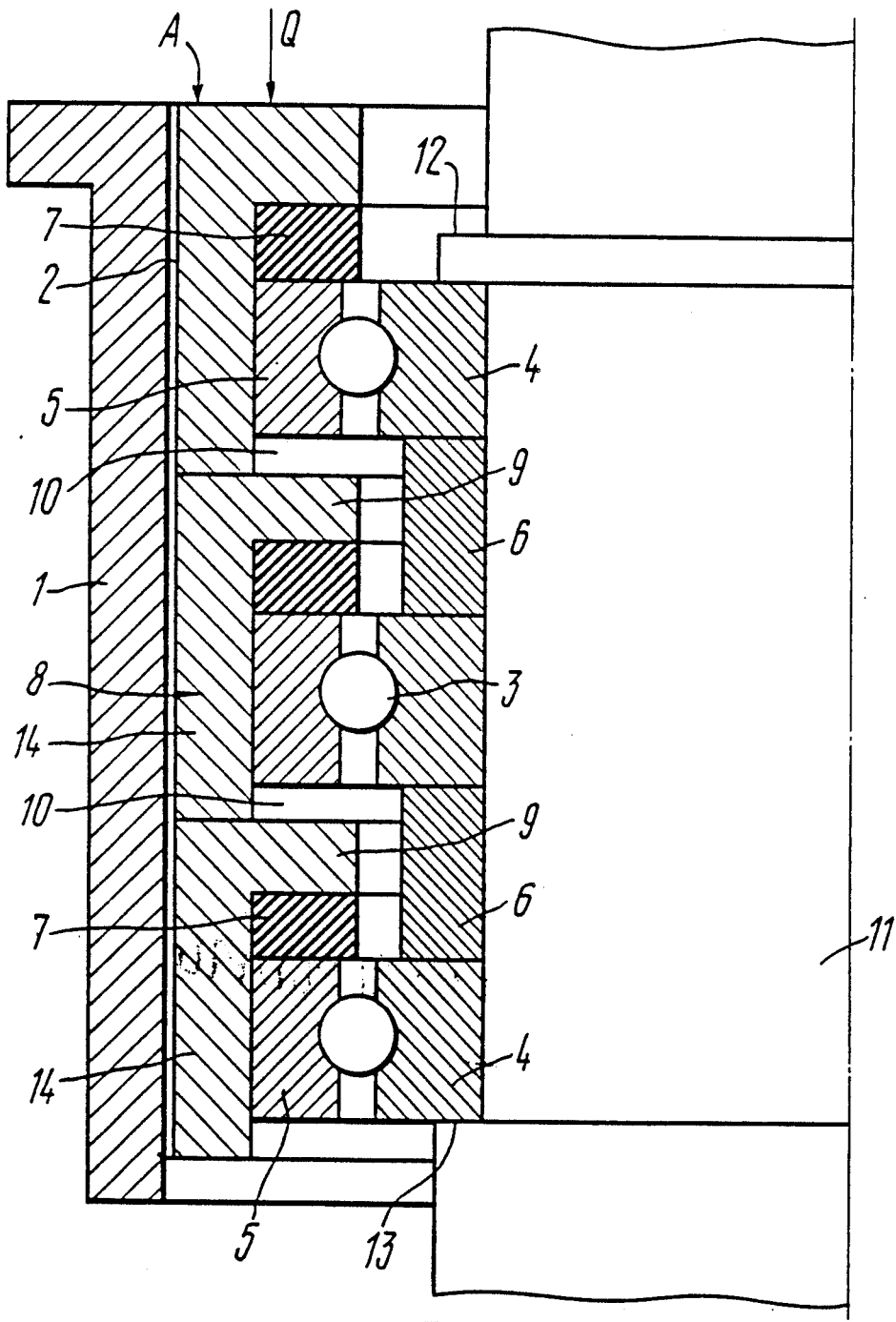
FIG. 1 shows a general view, in section, of a bearing assembly according to the invention.

A vertical bearing assembly comprises a casing 1 (FIGS. 1,2) accommodating antifriction bearings mounted in a radially spaced relation 2 thereto, each bearing being defined by bodies of revolution 3 positioned between inner 4 and outer 5 races, and a load redistribution system A. The amount of clearance 2 is determined by a common movable or sliding fit.

The system A for redistribution of load comprises rigid spacer sleeves 6 provided between the identical inner races 4 of adjacent antifriction bearings, elastic members 7 in contact with the outer races 5, coupling members 8 and separating members 9 provided between the outer races 5 and defining an axial clearance 10. The coupling members 8 engage one another, and, via the separating members 9, the elastic members 7.

The inner races 4 of the bearings and the rigid spacer sleeves 6 are mounted on a shaft 11 and are held against axial movement, e.g. by shoulders 12 and 13 of the shaft 11.

The coupling members 8 may be of different design, which depends on speed of the shaft 11, type and magnitude of load. Thus, as shown in FIG. 1, each coupling member 8 is in the form of a bushing 14 having an inner shoulder defining the separating member 9. The bushings 14 bear against one another and are movable along the casing 1 under the action of a load. Each elastic member 7 is made in the form of a spacer, e.g. of rubber or any other elastic material and is placed between the separating member 9 and the outer race of the adjacent bearing with the formation of an axial clearance 10.

The bearing assembly according to the invention functions in the following manner.

The axial load Q is applied to the bearing assembly in the direction of arrow B. During rotation of the shaft 11, load Q is transmitted simultaneously through the separating members 9, bushings 14 and elastic members 7 to all outer races 5 of the antifriction bearings. The elastic members 7 are thus compressed and the bushings 14 with the separating members 9 are moved along the casing in the radial space 2, the outer rings 5 being moved in the axial clearances 10 thereby making up for errors of manufacture of the antifriction bearings and their elastic deformations. As all elastic members 7 are identical, and the amount of their elastic deformation is much greater than the errors of manufacture of the bearings and their elastic deformations, all bearings are simultaneously loaded with identical forces diminished in a ratio equal to the number of the bearings in the assembly.

Figure 2:
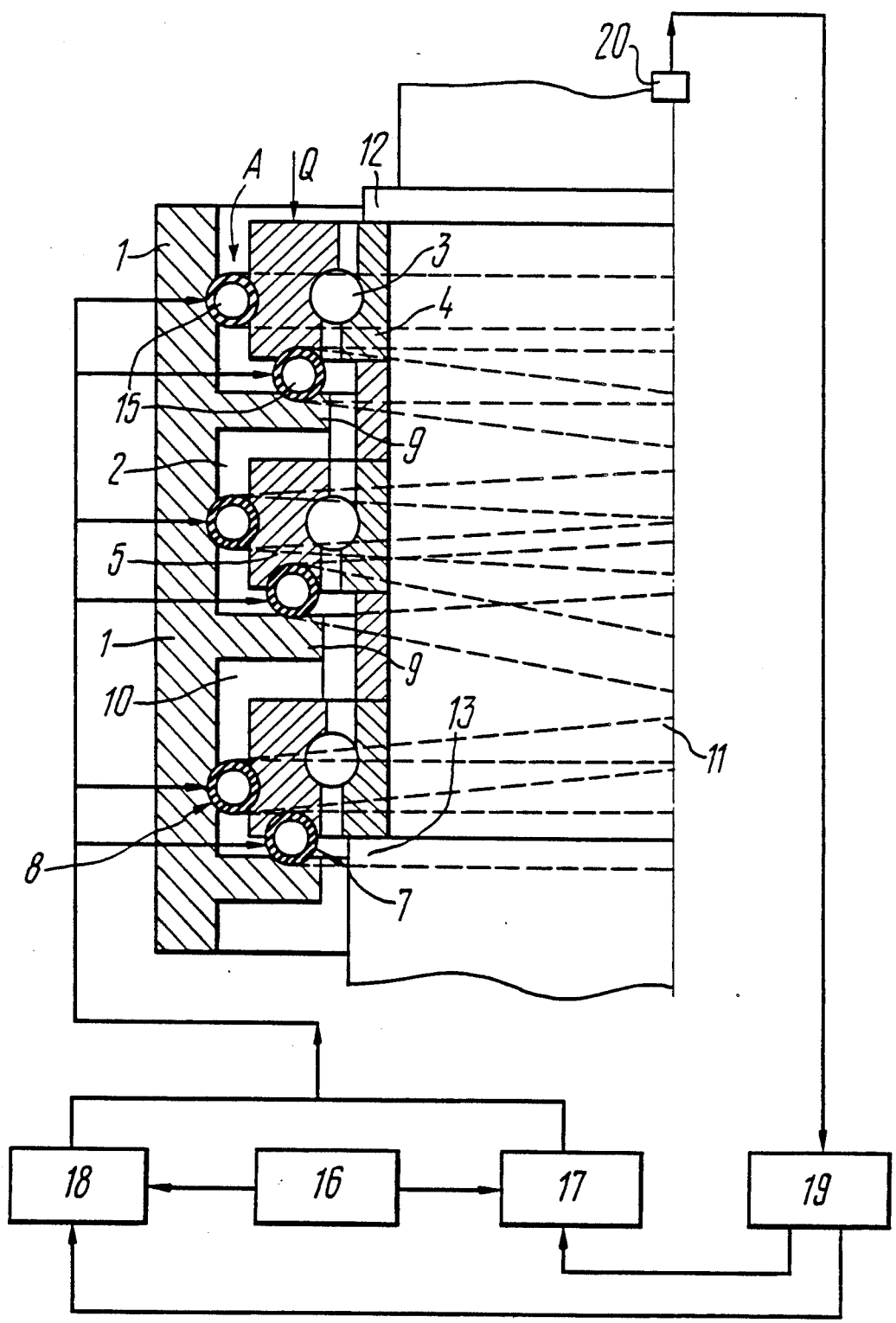
FIG. 2 is another embodiment of the bearing assembly.

In accordance with another embodiment of the invention, the elastic members 7 and the coupling members 8 are in the form of hollow chambers 15 (FIG. 2) communicating with one another and filled with a compressed gas. The hollow chambers 15 may be in the form of an air hose extending in the form of a helical line through the whole bearing assembly and positioned as shown in FIG. 2, i.e. each bearing having one turn of the air hose which defines the coupling member 8 and which is located in the space 2 between the casing 1 and the outer race 5, another turn defining the elastic member 7 being located between the outer race 5 and the horizontal separating member 9.

In this embodiment, the separating members 9 are rigidly internally secured to the casing 1. A control unit is provided in the bearing assembly for controlling operation of the chambers 15, the control unit comprising a pressure source 16, high- and low-pressure receivers 17 and 18, respectively, a feedback line 19, and a pick-up 20 of speed of the shaft 11, which are made of conventional components known to those skilled in the art. Outlets of the high- and low-pressure receives 17 and 18, respectively, are connected to the hollow chambers 15, outlets of the pressure source 16 are connected to inlets of the receivers 17 and 18, and the feedback line 19 has its inlet connected to the speed pick-up 20 and outlets connected to the receivers 17 and 18.

This bearing assembly functions in the following manner.

Initially, a low pressure is maintained in the receiver 17, which is ten-fifteen times as low as high pressure in the receiver 18. When the shaft 11 rotates under load Q, this load is simultaneously transmitted through the hollow chambers 15 to all bearings of the assembly. As the hollow chambers 15 are interconnected and connected to one and the same receiver, pressures in each chamber are identical so as to result in a simultaneous distribution of the load among all the bearings as described above.

The high-pressure receiver 18 is connected to the chambers 15 when speed of the shaft 11

$$\omega < \omega_o \sqrt{\frac{1+K}{2}},$$

wherein $\omega_0$ is the fundamental frequency of the system then the high-pressure receiver is connected to the hollow chambers; k is the ratio of pressure in the low-pressure receiver to pressure in the high-pressure receiver. If $$\omega < \omega_o \sqrt{\frac{1+K}{2}},$$

the high-pressure receiver is disconnected through the feedback line, and the low-pressure receiver is connected.

Figure 3:
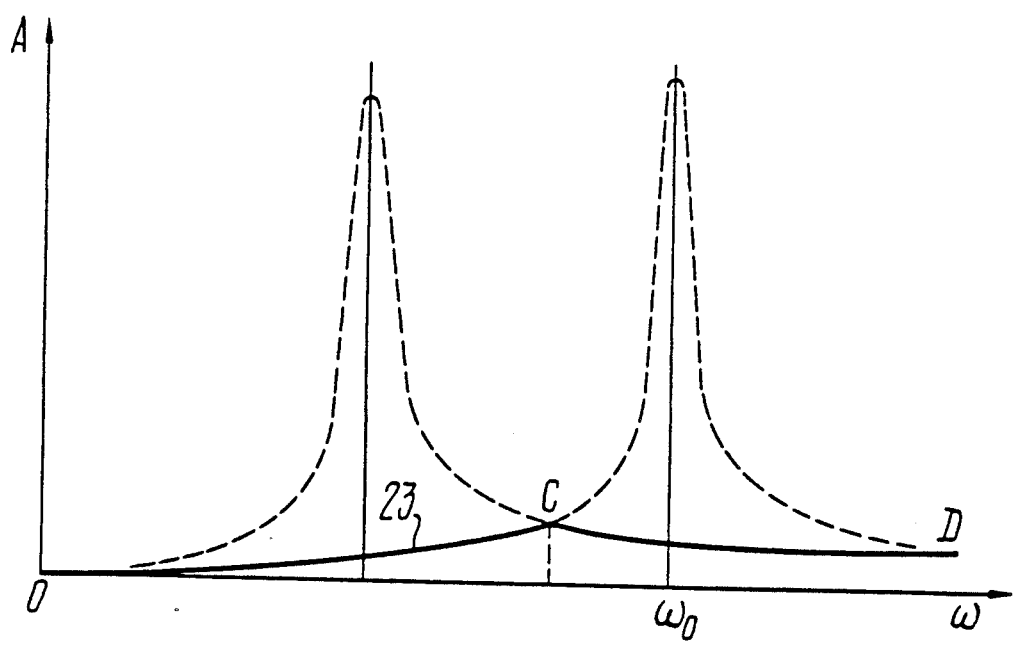
FIG. 3 is a diagram showing the amplitude-frequency characteristic of the bearing assembly.
Figure 4:
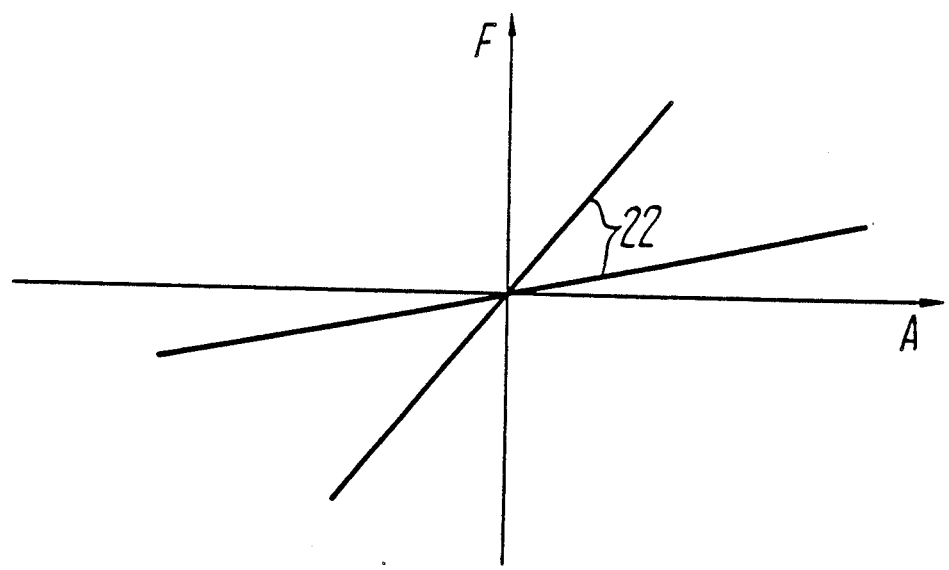
FIG. 4 shows a diagram of the force characteristic of the bearing assembly.

The reduction of dynamic load on the bearing assembly is illustrated in the amplitude-frequency characteristic (FIG. 3) and force characteristic (FIG. 4). It can be seen from these diagrams that during acceleration of the bearing, the centrifugal force F (line 22 in FIG. 4) and amplitude A of oscillations (line 23 in FIG. 3) increase with an increase in the speed $\omega$. This mode of operation is illustrated by a portion OC of the line 23 of the amplitude-frequency characteristic. When the shaft 11 gains a speed $$\omega > \omega_o \sqrt{\frac{1+K}{2}},$$

the interior spaces of the hollow chambers 15 are switched over from the high-pressure receiver 17 to the low-pressure receiver 18. With a further increase in speed of the shaft, amplitude A of oscillations of the bearing assembly decreases as shown by a portion CD of the line 23. Under braking conditions, i.e. with a decrease in speed $\omega$, amplitude A of the shaft oscillations increases as shown by a portion DC until switching over from the low-pressure receiver to the high pressure receiver which occurs at a speed $$\omega = \omega_o \sqrt{\frac{1+K}{2}},$$

as illustrated by a portion CO.

Thus, as a result of switching of the receivers under acceleration and braking conditions, amplitude of oscillations of the bearings is limited by the point C of the amplitude-frequency characteristic.

Limitation of the amplitude of oscillations of the bearings contributes to a decrease in the dynamic load, hence enhances reliability of the bearing assembly.

INDUSTRIAL APPLICABILITY

A bearing assembly may be used in heavy-duty high-speed vertical shafts in vertical centrifugal machines, drilling rigs and generators.

We claim:

1. A vertical bearing assembly, comprising a casing (1) accommodating antifriction bearings mounted above one another with a radial clearance (2), each having bodies of revolution (3) positioned between inner (4) and outer (5) races, and a system (A) for load redistribution between the antifriction bearings, having elastic members (7) positioned between identical races (5), characterized in that the load redistribution system (A) comprises rigid spacer sleeves (6) provided between other identical races (4) of the adjacent antifriction bearings, (3), separating members (9) positioned between the identical races (3) of the bearings which are in contact with the elastic members, an axial clearance (10) being defined therebetween, and coupling members (8) engaging one another, and, via the separating members, (9), the elastic members (7).

2. A bearing assembly according to claim 1, characterized in that the coupling members (8) comprise bushings (14) each having an inner annular shoulder defining the separating member (9), the bushings being movable along the casing (1), the elastic members (7) comprising spacers.

3. A bearing assembly according to claim 1, characterized in that the elastic members (7) and coupling members (8) comprise hollow chambers (15) communicating with one another and filled with a compressed gas, the separating members (9) being rigidly secured to the casing (1).

4. A bearing assembly according to claim 3, characterized in that it comprises a unit for controlling operation of the hollow chambers (15), comprising a pressure source (16), high- and low-pressure receivers (17 and 18), respectively, and a feedback line, the high- and low-pressure receivers (17 and 18) being connected to the hollow chambers (15), pressure source (16) and feedback line (19).

* * * * *